Aug. 14, 1956
W. A. HARTMANN
2,758,470
DEW POINT TESTER
Filed July 20, 1953
2 Sheets-Sheet 1
*Fig. 2.*
*Fig. 1.*
*Fig. 5.*
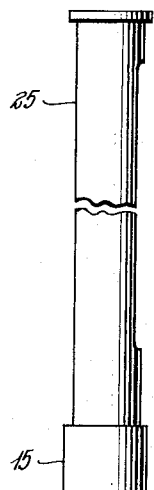
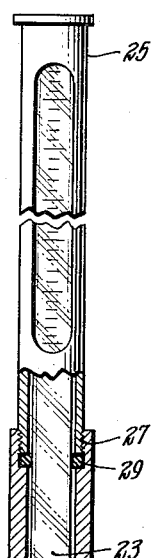
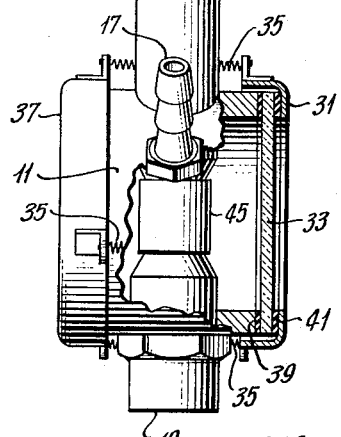
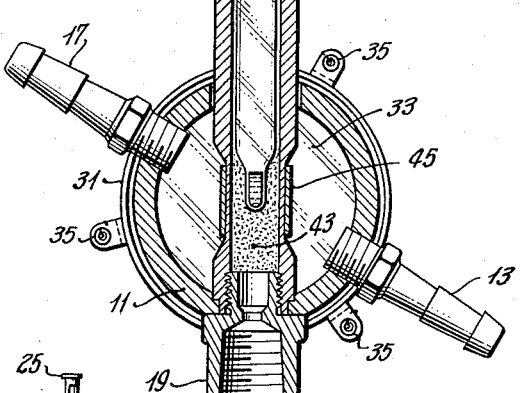
*Fig. 7.*
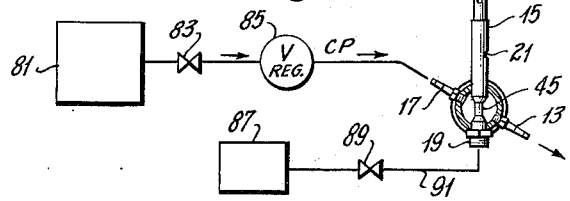
INVENTOR.
W. A. Hartmann
BY
Hudson & Young
ATTORNEYS.

Aug. 14, 1956 W. A. HARTMANN 2,758,470
DEW POINT TESTER
Filed July 20, 1953. 2 Sheets-Sheet 2
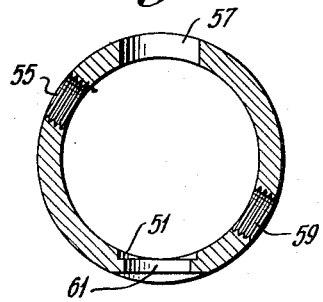
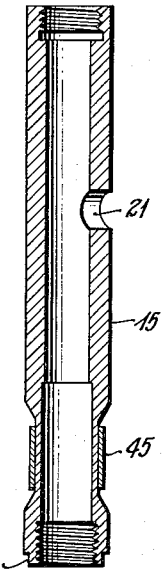
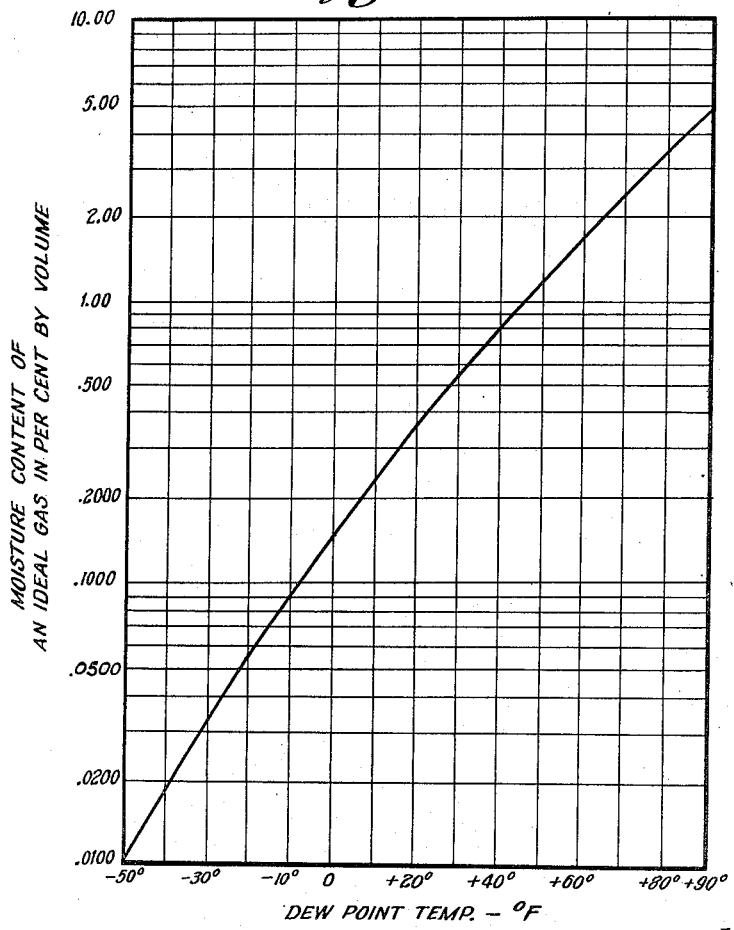
INVENTOR.
W. A. Hartmann
BY
ATTORNEYS United States Patent Office 2,758,470
Patented Aug. 14, 1956

2,758,470

DEW POINT TESTER

William A. Hartmann, Bartlesville, Okla., assignor to Phillips Petroleum Company, a corporation of Delaware Application July 20, 1953, Serial No. 369,151

6 Claims. (Cl. 73—17)

This invention relates to dew-point testers. In one aspect it relates to a portable dew-point tester embodying a safety pressure relief, and adaptable for use by unskilled labor. In another aspect it relates to such a dew-point tester for determining the moisture content of gaseous hydrocarbons.

Knowledge of the temperature to which a gas unsaturated with respect to water vapor may be cooled before the water will begin to condense is desirable, and frequently is necessary, in many research and industrial activities. This temperature, commonly called dew-point, is particularly important in high pressure gas transmission whereas condensed water may interfere with the flow of gas in the pipeline. Sometimes this interference is due only to the presence of liquid water and other times under certain conditions of temperature and pressure the water may combine with the gaseous hydrocarbons to form solid gas hydrates. These solid components may collect in sufficient quantity to reduce materially the effective cross sectional area of the pipeline or even to plug the pipeline completely.

Liquefied petroleum gases are sold under various specifications, one of which is the moisture content. My apparatus is especially useful in determining the moisture content of liquefied petroleum gas type hydrocarbons, either before liquefaction or of the reevaporated gas following liquefaction. In further explanation this latter application refers to such conditions as determining the moisture content of LPG vapors as they flow from an LPG storage tank, bottle, tank car or truck.

An object of my invention is to provide a dew-point tester for use in determining dew-point of gases.

Another object of my invention is to provide a dew-point tester which is relatively simple and inexpensive to manufacture.

Another object of my invention is to provide a dew-point tester having a pressure relief element for safety purposes and having an efficient means for equalization of temperature between critical parts of the apparatus.

Still another object of my invention is to provide a dew-point tester which is relatively simple to operate and with which reproducible determinations can be made.

Still another object of my invention is to provide a dew-point tester of simple construction and operation adaptable for use with unskilled help.

Still other objects and advantages of my invention will be obvious to those skilled in the art upon reading the following specification and disclosure which respectfully describes and illustrates a preferred embodiment of my invention.

My apparatus comprises mainly a cylindrical body member of length about equal to its inside diameter. A tube is inserted through openings in opposite sides of the cylindrical walls to accommodate a tube containing a temperature indicating device and through which a cooling agent can pass. A portion of the tube's outer wall within the cylindrical body is mirrored. Connections are provided for inlet and outlet of gas to be tested. The open circular ends of the body are covered with spring loaded cover plates. These plates are transparent for observation of the mirrored surface of the tube. A conventional thermometer or a thermocouple can be inserted into the tube to a point adjacent the mirrored surface for temperature determination.

In the drawing: Figure 1 is an elevational view, partly in section, of my dew-point apparatus.

Figure 2 is a side elevational view, partly in section, of the apparatus of Figure 1.

Figure 3 is a cross sectional view of a portion of the apparatus of Figure 1.

Figure 4 is a longitudinal sectional view of a portion of the apparatus of Figure 1.

Figure 5 is a longitudinal view, partly in section, of an apparatus useful with the apparatus of my invention.

Figure 6 is a chart showing the relationship between dew-point temperatures in degrees Fahrenheit and the moisture content of an ideal gas.

Figure 7 illustrates, diagrammatically, an assembly of apparatus parts useful in conjunction with the apparatus of my invention.

Referring now to the drawing and specifically to Figure 1 reference numeral 11, identifies a cylindrical body member having a length approximately equal to its inside diameter. Through openings in the top and bottom of this housing member is inserted a tube 15. This tube 15 is provided with a shoulder 53 (see Figure 4) which is intended to rest against a corresponding shoulder 51 in the bottom opening of housing 11 (see Figure 3). Member 19 is threaded to the lower end of tube 15 and holds tube 15 tightly against the shoulder 51 of the housing. The case or housing 11 is provided with threaded connections 17 and 13 for inlet and outlet of gas to be tested.

The tube 15 is provided with threads 27 at the top end for accommodation of a thermometer 23, the upper portion of which is partially enclosed in a protective case 25. The bottom of the case 25 rests against an O-ring which functions mainly as a gasket. An opening 21 is provided in the wall of the tube 15 for outlet of refrigerant to be discussed hereinbelow.

A frame 31 illustrated in Figure 2, holds a glass or other transparent cover plate 33 against the end of the housing 11. However, gasket 39 is provided between the cover plate and the housing. At the opposite end of the housing 11 is provided another gasket, cover plate and frame 37. These two frames are connected to one another by some tension springs 35. At least two tension springs are needed and, if desired, more than two, for example 3, may be used as desired. These springs are intended to hold the cover plates gas-tight against the body member 11. If pressure builds up within the body member 11 for any reason whatever these springs will yield, allowing gas to escape and the pressure to be reduced inside the housing to about atmospheric pressure.

In the tube 15, at a point within the housing member 11 is provided a quantity of copper turnings 43, preferably fine turnings, to assist in distributing heat or cold to all parts of this section of the tube. The outer wall of the tube 15 is thinned at this point to assist in transfer of heat from within the tube to the outer wall of the tube. This thin walled section of tube 15 is mirrored as for example, by chrome or nickel plating. When the thermometer 23 is inserted in its operative position it is intended that the thermometer bulb be in the immediate vicinity of the mirror 45 so that the bulb will come as nearly as possible to indicating the actual temperature of the mirror.

The cover plates 33 as mentioned above may be made of glass, plastic or other transparent material which is sufficiently strong to serve as a protective cover and yet be transparent so that an operator may look through the cover plate and observe the condition of the mirrored surface 45. Resinous or plastic materials are preferable for cover plates since they have the added advantage of being unbreakable. While it is not necessary that both cover plates be transparent, it is preferred however.

If dew-point determinations are to be made the temperature of which might be expected to approach minus 40° F., the freezing point of mercury, it will be preferable to use another type of temperature indicating device. In place of a mercury-in-glass thermometer, an alcohol-in-glass or toluene-in-glass thermometer, etc., may be used. When such liquids as alcohol or toluence are used in thermometers the liquids are ordinarily colored. If desired, however, a thermocouple protected by a metal tube may be used in place of the thermometer. Such a thermocouple is illustrated in Figure 5 and consists of a metal sheath 69 containing the wires 65 threaded through ceramic members 63 in a conventional manner. These wires are connected at their lower ends to form a junction. A threaded cap is provided at the top end of this metal sheath for insertion of this instrument into the top of the tube 15 of Figures 1 and 2. If a metal sheath protected thermocouple is used the sheath is surrounded by heat conducting metal turnings as explained above.

In the operation of the apparatus of my invention the gases such as liquefied petroleum gases from a source 81 (Figure 7) are passed through a valve 83 and thence as a vapor to a constant pressure outlet valve 85. Effluent gas from the regulator 85 passes on through connection 17 into the tester and thence out via connection 13. The gas is passed through this apparatus for a short period of time in order to displace air or other gas from the apparatus. A refrigerant from source 87 and controlled by valve 89 is then passed via conduit 91 into the tester through fitting 19. The flow of refrigerant is continued until the temperature within the tube 15, as indicated by thermometer 23, reaches such a point at which dew is condensed upon the mirrored surface 45. The deposition of dew onto this surface may be observed through the transparent cover plates. The temperature at which the first clouding of the mirrored surface is observed is recorded as the dew-point of the gas being tested. It is necessary to pass the refrigerant through tube 15 at a relatively slow rate so that cooling will not be too rapid. By the term "not too rapid" is meant the passage of the refrigerant at such a rate that the thermometer bulb and mirrored surface will be at the same temperature. The circular walls of the tube 15, which are mirrored, are made relatively thin in comparison to the remainder of the tube 15 to reduce temperature lag from the refrigerant to the mirrored surface.

Such a constant pressure outlet valve as valve 85 is standard apparatus and can be obtained from equipment supply houses. This valve is of the type which receives gas at a pressure higher than atmospheric and discharges the gas at a reduced pressure. Atmospheric pressure is, however, the limit to which the pressure can be reduced.

In general, the lower the moisture content of the gas the lower will be the dew-point temperature. For very low moisture content gases dew-point temperatures may be lower than the melting point of mercury and under such a condition it is obvious that a conventional mercury-in-glass thermometer cannot be used. An alcohol or toluene filled thermometer carrying a dye for color may be used. Such thermometers are available in commerce. However, if desired, in place of alcohol or toluene thermometers a thermocouple apparatus such as that illustrated in Figure 5 may be used. When using such a thermocouple a potentiometer and associated apparatus understood by those skilled in the art will be necessary.

As mentioned hereinbefore my apparatus is intended to measure the dew-point of gases at atmospheric pressure and that is the reason for provision of the spring loaded cover plate holding frames 37. If for any reason whatever the outlet 13 or associated tube or pipe becomes plugged or if the rate of inlet of gas being tested increases abruptly the cover plates can be lifted from their seats and relieve the pressure. When this pressure is released the springs 35 return the frames and the cover plates back to their normal position against the body member 11.

If, for any reason whatever, it is desired to measure the rate of flow of gas being tested through this apparatus a meter may be connected with the gas outlet 13, but the use of a pressure regulator as hereinbefore described is preferred. A gas meter can also be used to measure the rate of refrigerant flow by connection with the refrigerant outlet.

When the tube 15 is made of hard drawn brass the mirrored section 45 can be made relatively thin and yet be sufficiently strong to withstand manufacture and subsequent handling. In using my apparatus the total moisture content of the gas may be obtained from the dew-point observations. These moisture contents can be obtained from the curve illustrated in Figure 6. This curve is produced from dew-point and moisture content data of an ideal gas. The abscissa are dew-point temperature in °F. while the ordinates represent moisture content of the ideal gas in per cent by volume. For example, if a dew-point determination shows that the dew-point temperature of a gas is, for example, minus 10° F., minus 10° is found in the abscissa and from the point at which the 10° ordinate intersects the curve the moisture content of the gas is found to be approximately .09 per cent by volume. This dew-point and moisture content data of an ideal gas is found to be sufficiently accurate for commercial and many research purposes provided the moisture content of the gas is reasonably low. That is, the ideal gas laws are accurate for low concentrations and deviations of actual gases from the ideal gas laws are small for low concentrations of one gas or vapor in another gas.

The refrigerant used for cooling the mirrored surface 45 may be any convenient and desired refrigerant. For many purposes liquefied petroleum gas is found to be a convenient refrigerant. Such materials may be obtained in liquid form under pressure in heavy metal tanks or bottles. If, however, such material is not available carbon dioxide may be used. Liquid carbon dioxide from a pressure tank or solid carbon dioxide may be used for this cooling.

Another advantage of the spring loaded cover plate apparatus of my invention is that one or both of the plates may be easily removed for cleaning the mirrored surface following each dew-point determination.

Under certain conditions the dew which deposits and clouds the mirrored surface will be liquid water while under other conditions this dew will be solid, i. e., ice. The determinig factor as to whether the dew cloud is liquid or solid is temperature. At dew points below 32° F. the dew will be ice. Under all conditions, that is those yielding dew or solid dew, the cloud on the mirrored surface is easy to detect through the transparent cover plates.

While certain embodiments of my invention have been described for illustrative purposes the invention obviously is not limited thereto.

I claim:

1. A device for determining the dew-point of gases comprising a hollow cylindrical body member having its inside diameter about equal to its length, a pair of diametrically opposite openings in the cylindrical wall of said member, a tube extending through said body member and said openings, the ends of said tube extending beyond the respective outer walls of said body member, a pair of spring loaded cover plates covering the open ends of said body member, a portion of the outer surface of said tube within said body member being mirrored, at least one of said cover plates being transparent for viewing the mirrored surface of said tube, the springs of said spring loaded cover plates biasing said plates gas-tight against the open ends of said body member, a temperature indicating means in said tube for indicating temperature of said mirrored surface, means for admitting refrigerant to said tube, outlet means for refrigerant from said tube, and means for inlet and outlet of gas for said body member.

2. A device for determining the dew-point of gases comprising a hollow cylindrical body member having its inside diameter about equal to its length, a pair of diametrically opposed openings in the cylindrical wall of said member, a tube extending through said body member and said openings, the ends of said tube extending beyond the outer walls of said body member, a pair of spring loaded cover plates covering the open ends of said body member, the springs of said spring loaded plates biasing said cover plates gas-tight against the ends of said body member, a portion of the outer surface of said tube within said body member being mirrored, at least one of said spring loaded cover plates being transparent for viewing the mirrored portion of said tube, a temperature indicating means in said tube for indicating temperature of the mirrored portion of said tube, inlet means for admission of refrigerant to said tube on one side of said body member, outlet means for outlet of refrigerant from said tube on the other side of said body member, an inlet for admission of gas to the interior of said body member and an outlet for outlet of gas therefrom.

3. The dew-point determining device of claim 2 wherein the temperature indicating means is a liquid-in-glass thermometer.

4. The dew-point determining device of claim 2 wherein the temperature indicating means is a thermocouple.

5. In the device of claim 2 a permeable metallic heat conducting means surrounding said temperature indicating device in said tube for promoting equalization of temperature throughout the cross sectional area of said tube adjacent said temperature indicating device and the wall of said tube directly inside of said mirrored portion.

6. A dew point tester system comprising, in combination, a source of moisture containing gas, a first conduit connected with said source of gas for flow of gas therefrom, a constant pressure outlet valve in communication with said conduit for passage of gas at a constant outlet pressure, a second conduit connected with the outlet of said constant pressure outlet valve, a dew-point tester assembly in communication with said second conduit, a source of refrigerant, a third conduit connected with said source of refrigerant and with said dew-point tester assembly, said dew-point tester assembly comprising, in combination, a hollow cylindrical body member having its inside diameter about equal to its length, a pair of diametrically opposed openings in the cylindrical wall of said member, a tube extending through said body member and said openings, the ends of said tube extending beyond the outer walls of said body member, a pair of spring loaded cover plates, covering the open ends of said body member, a portion of the outer surface of said tube within said body member being mirrored, at least one of said cover plates being transparent for viewing the mirrored surface of said tube, the springs of said spring loaded cover plates biasing said plates gas-tight against the open ends of said body member, a temperature indicating means in said tube for indicating temperature of said mirrored surface, a permeable metallic heat conducting means surrounding the temperature indicating device in said tube for promoting equalization of temperature throughout the cross sectional area of said tube adjacent said temperature indicating device and the wall of said tube directly inside of said mirrored portion, said third conduit connected with said source of refrigerant and with said dew-point tester being connected to said tube containing said temperature indicating means, a vent in said tube opposite the temperature sensitive portion of said temperature indicating means from the point of connection with said third conduit, a tube connection attached to the cylindrical wall of said body member for inlet of gas to be tested, said tube connection being connected with said second conduit for passage of gas to be tested into said dew-point tester assembly, a vent in said cylindrical wall of said body member opposite said tube connection for outlet of gas undergoing test.

References Cited in the file of this patent

UNITED STATES PATENTS

| | | |
|---|---|---|
| 2,281,418 | Deaton et al. | Apr. 28, 1942 |
| 2,316,624 | Romanelli | Apr. 13, 1943 |
| 2,415,776 | Walton | Feb. 11, 1947 |
| 2,433,486 | Schmitz | Dec. 30, 1947 |

FOREIGN PATENTS

| | | |
|---|---|---|
| 317,306 | Great Britain | Aug. 12, 1929 |